(12) United States Patent
Yang et al.

(10) Patent No.: US 9,429,987 B2
(45) Date of Patent: Aug. 30, 2016

(54) ELECTRONIC DEVICE CAPABLE OF ROTATING DISPLAY IMAGE AND DISPLAY IMAGE ROTATING METHOD THEREOF

(71) Applicant: Wistron Corp., New Taipei (TW)

(72) Inventors: Kai-Hsiang Yang, New Taipei (TW); Yuju Liu, New Taipei (TW); Che-Wen Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 289 days.

(21) Appl. No.: 14/283,781

(22) Filed: May 21, 2014

(65) Prior Publication Data

US 2015/0206284 A1    Jul. 23, 2015

(30) Foreign Application Priority Data

Jan. 17, 2014    (TW) .............................. 103101852 A (51) Int. Cl.
*G09G 5/00* (2006.01)
*G06F 1/16* (2006.01)

(52) U.S. Cl.
CPC ........... *G06F 1/1618* (2013.01); *G06F 1/1677* (2013.01); *G06F 1/1681* (2013.01); *G06F 2200/1614* (2013.01)

(58) Field of Classification Search
CPC .......... G06F 1/1613; G06F 3/03; G06T 3/60
See application file for complete search history.

(56) References Cited

U.S. PATENT DOCUMENTS

2003/0042122 A1* 3/2003 Sato ...................... H01H 21/24
200/343
2009/0244832 A1* 10/2009 Behar ...................... G06F 1/162
361/679.55
2011/0157231 A1   6/2011  Ye et al.
2012/0194977 A1   8/2012  Liu et al.
2014/0009387 A1*  1/2014  Hwang ...................... G06F 3/03
345/156
2015/0092323 A1*  4/2015  Feng ...................... G06F 1/1671
361/679.1

FOREIGN PATENT DOCUMENTS

| CN | 102037425 A | 4/2011 |
| TW | 432239 B | 5/2001 |
| TW | 201232228 A | 8/2012 |
| TW | 201303847 A | 1/2013 |
| WO | 2009/123931 A1 | 10/2009 |

OTHER PUBLICATIONS

Office Action dated Sep. 8, 2015 as received in TW103101852.

* cited by examiner

*Primary Examiner* — Weiming He
(74) *Attorney, Agent, or Firm* — Maschoff Brennan (57) ABSTRACT

A method, for rotating a display image of an electronic device, includes the following steps. Whether an absolute rotation angle of a display of the electronic device relative to a gravity axis is equal to or greater than a predetermined absolute angle threshold is detected. Whether a relative rotation angle of the display relative to a base of the electronic device is between a first and a second relative angle threshold is detected. The display image is maintained when the absolute rotation angle is equal to or greater than the predetermined absolute angle threshold and the relative rotation angle is between the first and second relative angle thresholds. The display image is rotated when the absolute rotation angle of the display is equal to or greater than the predetermined absolute angle threshold but the relative rotation angle is not between the first and second relative angle thresholds.

17 Claims, 9 Drawing Sheets

ELECTRONIC DEVICE CAPABLE OF ROTATING DISPLAY IMAGE AND DISPLAY IMAGE ROTATING METHOD THEREOF

CROSS-REFERENCE TO RELATED APPLICATIONS

This non-provisional application claims priority under 35 U.S.C. §119(a) on Patent Application No(s). 103101852 filed in Taiwan, R.O.C. on Jan. 17, 2014, the entire contents of which are hereby incorporated by reference.

TECHNICAL FIELD

The disclosure relates to an electronic device, and more particularly to an electronic device capable of rotating a display image and a display image rotating method thereof.

BACKGROUND

With the improvement of technology, electronic devices are developed towards being small in size and light in weight, so it is convenient for users to carry them outdoors. Moreover, the boundaries between laptop computers, tablet computers and cell phones are indistinct.

Take laptop computer for example, the laptop computer comprises a display and a base. When the laptop computer is at a folding state, the display faces a keyboard module of the base. When the laptop computer operates, the display can be expanded to rotate from the keyboard module of the base towards the direction away from the base. When the angle of rotation is less than 180 degrees, a user may put the base on a desk or on his/her lap (namely, thigh) and inputs commands via the keyboard module or a touch module of the display. This is the normal operation mode for the user to operate the laptop computer.

When the display rotates about the base over 180 degrees to become a reverse-V shape, two opposite ends of the display and the base may lean against or stand on the desk or the user may hold it by hand. A display image of the display can be rotated (namely, flipped over) to a desired viewing angle according to the current using condition by the automatic detection of a gravity sensor (G-Sensor). Therefore, the user can operate the laptop computer by touching a touch module of the display. This operation mode is similar to that of the tablet computer. Furthermore, when the display rotates by 360 degrees, a rear housing of the display leans against a bottom housing of the base, exposing the display image of the display. The user may operate the laptop computer as a hand-held or put it on the desk similar to the way a tablet computer is used.

However, when the display rotates by over 180 degrees, the user may hold the laptop computer by hand or put it on the desk. Because the laptop computer may be disposed to be inclined (not horizontal or vertical to the axis of gravity), the G-sensor may rotate (flip over) the display image according to its degree of inclination, which does not meet the actual using situation. Thus, the user may view the display image which is up-side-down. As result, this kind of automatic rotation of the display image is inconvenient for the user to use the laptop computer.

SUMMARY

An embodiment of the disclosure provides a method for rotating a display image of an electronic device. The electronic device has a display and a base pivoted to the display. The method comprises the following steps. Whether an absolute rotation angle of the display of the electronic device relative to a gravity axis is equal to or greater than a predetermined absolute angle threshold is detected. Whether a relative rotation angle of the display of the electronic device relative to the base is equal to or greater than a first relative angle threshold and is equal to or less than a second relative angle threshold is detected. The orientation of the display image shown by the display is maintained when the absolute rotation angle of the display is equal to or greater than the predetermined absolute angle threshold and the relative rotation angle is equal to or greater than the first relative angle threshold and is equal to or less than the second relative angle threshold. The orientation of the display image shown by the display is rotated over when the absolute rotation angle of the display is equal to or greater than the predetermined absolute angle threshold but the relative rotation angle is not equal to or greater than the first relative angle threshold and is not equal to or less than the second relative angle threshold.

An embodiment of the disclosure provides a method for rotating a display image of an electronic device. The electronic device comprises a control module, a gravity sensor, an angle sensor, a display and a base pivotally connected to the display and has an orientation. The display is adapted to display the display image. The method comprises the following steps. Whether an absolute rotation angle of the display relative to a gravity axis detected by the gravity sensor is equal to or greater than a predetermined absolute angle threshold is determined; when the absolute rotation angle is equal to or greater than the predetermined absolute angle threshold, a first rotating signal is generated. Whether a relative rotation angle of the display relative to the base detected by the angle sensor is equal to or greater than a first relative angle threshold and is equal to or less than a second relative angle threshold is determined; when the relative rotation angle is equal to or greater than the first relative angle threshold and is equal to or less than the second relative angle threshold, a second rotating signal is generated. According to a relative relationship between the first rotating signal and the second rotating signal received by the control module, it determines to control whether the display image rotates by the control module.

An embodiment of the disclosure provides an electronic device, capable of rotating a display image, comprising a base, a display, a pivotal assembly, an angle sensor, a gravity sensor and a control module. The display has a top end and a bottom end that are opposite to each other. The pivotal assembly comprises at least one rotating axle; the bottom end of the display is pivotally connected to the base via the pivotal assembly. The angle sensor is mounted at the rotating axle, for detecting a relative rotation angle of the display relative to the base. The gravity sensor is mounted at the display, for detecting an absolute rotation angle of the display relative to a gravity axis. The control module is adapted to control a rotating state of a display image of the display according to a relative relationship between the absolute rotation angle and the relative rotation angle.

BRIEF DESCRIPTION OF THE DRAWINGS

The present disclosure will become more fully understood from the detailed description given hereinbelow, along with the accompanying drawings which are for illustration only, thus are not limitative of the present disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides an electronic device comprising a display and a base that are pivotally connected with each other. When the display rotates about the base, an orientation of a display image of the display of the electronic device is automatically rotated (namely, flipped over) or maintained according to current position of the display relative to the base and according to a current relative angle between the display and the base. This orientation of the display image is proper for a user to view along positive viewing direction according to the disposition of the electronic device based on the current using situation. In this disclosure, for example, the electronic device is a laptop computer, an all-in-one computer, a combination of a smartphone and a dock (e.g., a recharge module, an expansion module or an input module) pivotally connected to the smart phone, or a combination of a tablet computer and a dock pivotally connected to the tablet computer. However, the disclosure is not limited to the above-mentioned types of electronic device.

Figure 1:
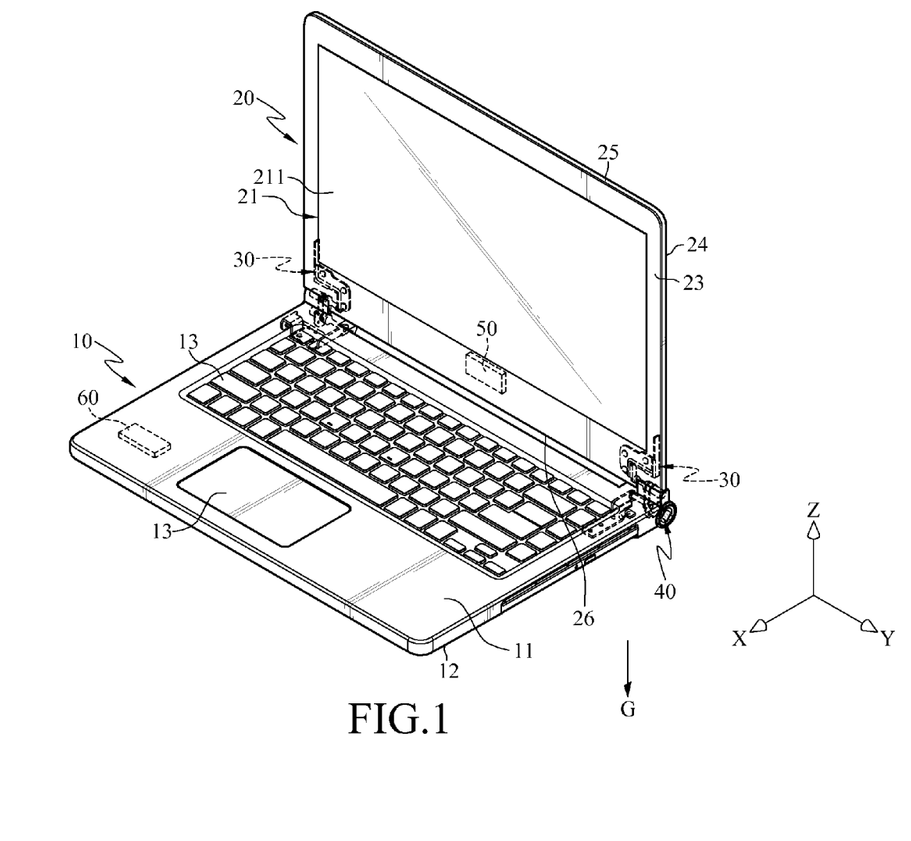
FIG. 1 is a perspective view of an electronic device according to an embodiment of the disclosure.

Please refer to FIG. 1, which is a perspective view of an electronic device according to an embodiment of the disclosure. The disclosure provides an electronic device 1 capable of rotating (namely, flipping over) a display image. The electronic device 1 comprises a base 10, a display 20, two pivotal assemblies 30, an angle sensor 40, a gravity sensor (G-sensor) 50 and a control module 60. The display 20 is pivotally mounted (namely, disposed or located) on a side of the base 10 via the two above-mentioned pivotal assemblies 30. The angle sensor 40 is mounted at one of the pivotal assemblies 30. The G-sensor 50 is mounted at the display 20. In this embodiment, the G-sensor 50 is mounted inside the display 20. The control module 60 is mounted inside the base 10, but in other embodiments, the control module 60 is mounted inside the display 20.

In this embodiment, the base 10 has a first surface 11 (i.e., top surface) and a second surface 12 (i.e., bottom surface). The base 10 further comprises an input module 13 disposed on the first surface 11. In this embodiment, the input module 13 comprises a keyboard and a touch panel. In other embodiments, the input module 13 may only comprise a keyboard or only comprise a touch panel. The user may input a command to the electronic device 1 via the keyboard and/or the touch panel. In other embodiments, the input module 13 may comprise several kinds of input apparatuses. In other embodiments, the base 10 or the display 20 may be connected to external input module (not shown) such as a mouse.

In this embodiment, the display 20 has a third surface 23 (i.e., a front surface) and a fourth surface 24 (i.e., a rear surface) that are opposite to each other and has a top end 25 and a bottom end 26 that are also opposite to each other. The pivotal assembly 30 is mounted at the bottom end 26. The display 20 further comprises a display module 21 for displaying (or showing) a display image 211. The display image 211 is exposed from the third surface 23 and adapted to display graphs or letters for the user to view them. Moreover, the display module 21 may further combine a touch module so the user may directly contact the display module 21 to input a command for the electronic device 1. The display 20 may rotate along the direction that the third surface 23 heads toward the base 10, the third surface 23 may approach the first surface 11 until it touches (or almost touches) the first surface 11 to be closed. When the display 20 expands by over 180 degrees to make the fourth surface 24 rotate away from the first surface 11 of the base 10, the fourth surface 24 gradually faces and approaches the second surface 12.

In this embodiment, the G-sensor 50 is mounted in the display 20 for detecting an "absolute rotation angle" of the display 20 in an absolute space coordinate defined by an X-axis direction, a y-axis direction and a z-axis direction (three axes) relative to a gravity axis G. In this embodiment, the G-sensor 50 is applied based on the principle of the Gyroscope theory for measuring relationships of azimuth and accelerations of movement and angular movement of the display 20 in the absolute space coordinate defined by the x-axis direction, the y-axis direction and the Z-axis direction (three axes). However, in other embodiments, as long as any electronic component is adapted to detect the absolute rotation angle of the display 20 relative to the gravity axis G, it can be regarded as the G-sensor 50 in this disclosure. When the G-sensor 50 detects (namely, senses) the absolute rotation angle of the display 20 (e.g., the angle between a display extension line L from the bottom end 26 to the top end 25 of the display 20 and the gravity axis G penetrating through the bottom end 26) is equal to or greater than a predetermined absolute angle threshold (e.g., 100 degrees), the display image 211 of the display 20 is controlled to be flipped over.

Figure 2:
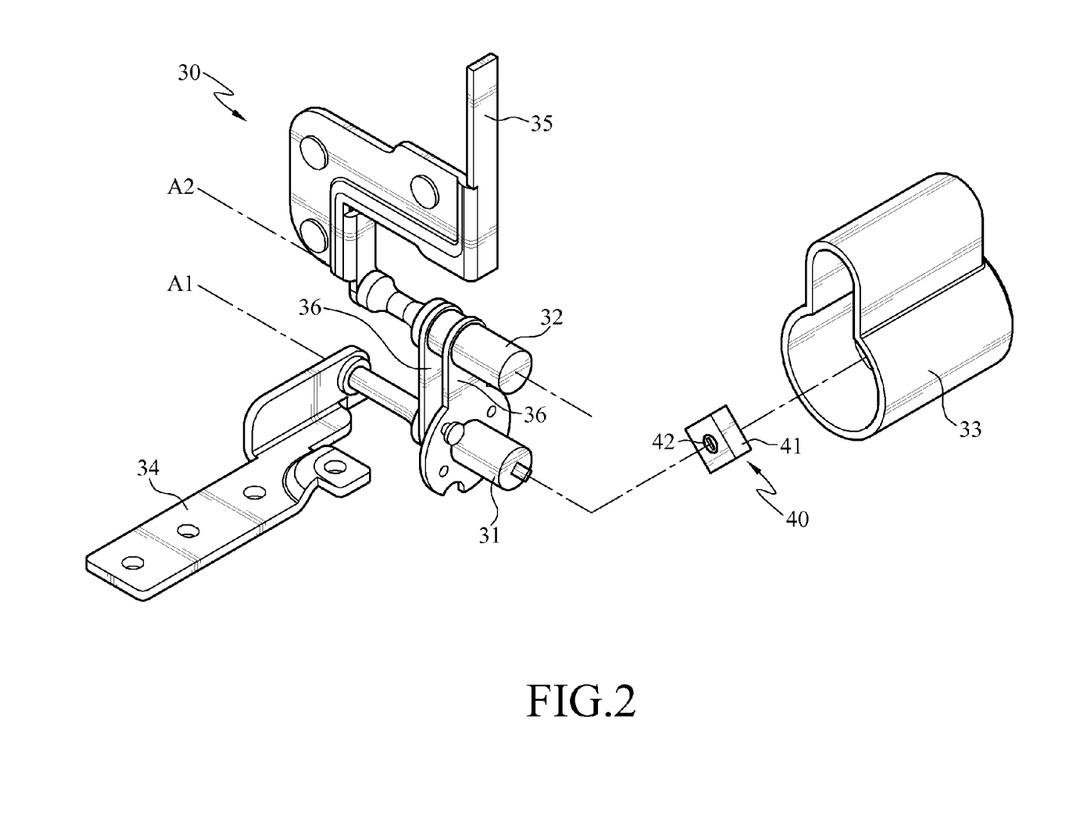
FIG. 2 is a partially exploded view of an electronic device according to an embodiment of the disclosure.

The following describes the detailed structure of the pivotal assembly 30 in this embodiment. Please refer to FIGS. 1 and 2 together, and FIG. 2 is a partially exploded view of an electronic device according to an embodiment of the disclosure. In this embodiment, the bottom end 26 of the display 20 is pivotally connected to the base 10 via the pivotal assembly 30. Moreover, the pivotal assembly 30 comprises a first rotating axle 31 and a second rotating axle 32. The rotation axis A1 of the first rotating axle 31 and the rotation axis A2 of the second rotating axle 32 are parallel to each other but not coaxial with each other. In this and some other embodiments, the pivotal assembly 30 further comprises two connection members 36, a housing 33, a first fixing member 34 and a second fixing member 35. The first rotating axle 31 is pivotally connected to one end of the connection member 36, and the second rotating axle 32 is pivotally connected to the other end of the connection member 36, such that the first rotating axle 31 and the second rotating axle 32 are adapted to rotate about the connection member 36, respectively. In addition, the housing 33 covers the connection member 36, at least a portion of the first rotating axle 31 and at least a portion of the second rotating axle 32, for preventing the connection member 36, the first rotating axle 31 and the second rotating axle 32 from exposure. The first fixing member 34 is fixedly mounted on the connection member 36 for rotating about the connection member 36. Moreover, the base 10 is connected to the first rotating axle 31 via the first fixing member 34. Similarly, the second fixing member 35 is fixedly mounted on the second rotating axle 32 and the display 20, and the display 20 is connected to the second rotating axle 32 via the second fixing member 35. Furthermore, in this embodiment, the rotational damping of the second rotating axle 32 is less than the rotational damping of the first rotating axle 31. Thus, when the user produces an external force to the display 20 to expand relative to the base 10, the second rotating axle 32 rotates relative to the connection member 36 at first (that is, a first stage rotation is defined). Until the second rotating axle 32 rotates about the connection member 36 to the maximum angle, the second rotating axle 32 stops rotating. Then, only when the external force is still applied to the display 20, the connection member 36 may rotate about the first rotating axle 31 (that is, a second stage rotation is defined). In other words, in this disclosure, when an external torque (force) is applied to the pivotal assembly 30, only the second rotating axle 32 rotates about the connection member 36 by 180 degrees before the connection member 36 starts to rotate about the first rotating axle 31. That is to say, when the display 20 is open and rotates about the base 10 until flipping over backward to lean against the bottom surface (i.e., the second surface 12) of the base 10, the first stage rotation and the second stage rotation are performed in sequence.

In this and some other embodiments, the angle sensor 40 is mounted at the first rotating axle 31 and electrically connected to the control module 60 via a cable wire (not shown). The angle sensor 40 is adapted to detect a relative rotation angle of the first rotating axle 31. In this disclosure, "relative rotation angle" represents an amount of rotation of the rotating axle (such as the first rotating axle 31 or the second rotating axle 32) relative to an object that is pivotally connected to the rotating axle. In this embodiment, the relative rotation angle is an amount of relative rotation between the first rotating axle 31 and the connection member 36, or an amount of relative rotation between the display 20 and the base 10. Furthermore, the angle sensor 40 is a variable resistor which comprises a main body 41 and a rotatable switch 42 mounted in the main body 41. The rotatable switch 42 is fixedly mounted at a positioning component (not shown, e.g., a pin) of the first rotating axle 31, the main body 41 is fixedly mounted inside an accommodation room of the housing 33. Therefore, when the amount of relative rotation between the first rotating axle 31 and the connection member 36 is generated, the main body 41 rotates about the rotatable switch 42, for changing the value of resistance of the variable resistor. Thus, the angle sensor 40 may detect the variation of the rotating axle rotation angle based on the value of resistance of the variable resistor.

As for the pivotal assembly 30 in this embodiment, the pivotal assembly 30 comprising the first rotating axle 31 and the second rotating axle 32 that are parallel to each other are taken as an example. However, in other embodiments, as long as only one rotating axle or other rotating axle assemblies, with suitable design, can satisfy that the display 20 may rotate about the base 10 by over 180 degrees via the rotating axle or other rotating axle components, the angle sensor 40 may be mounted at an appropriate position of the only one rotating axle or other rotating axle assemblies.

Figure 3:
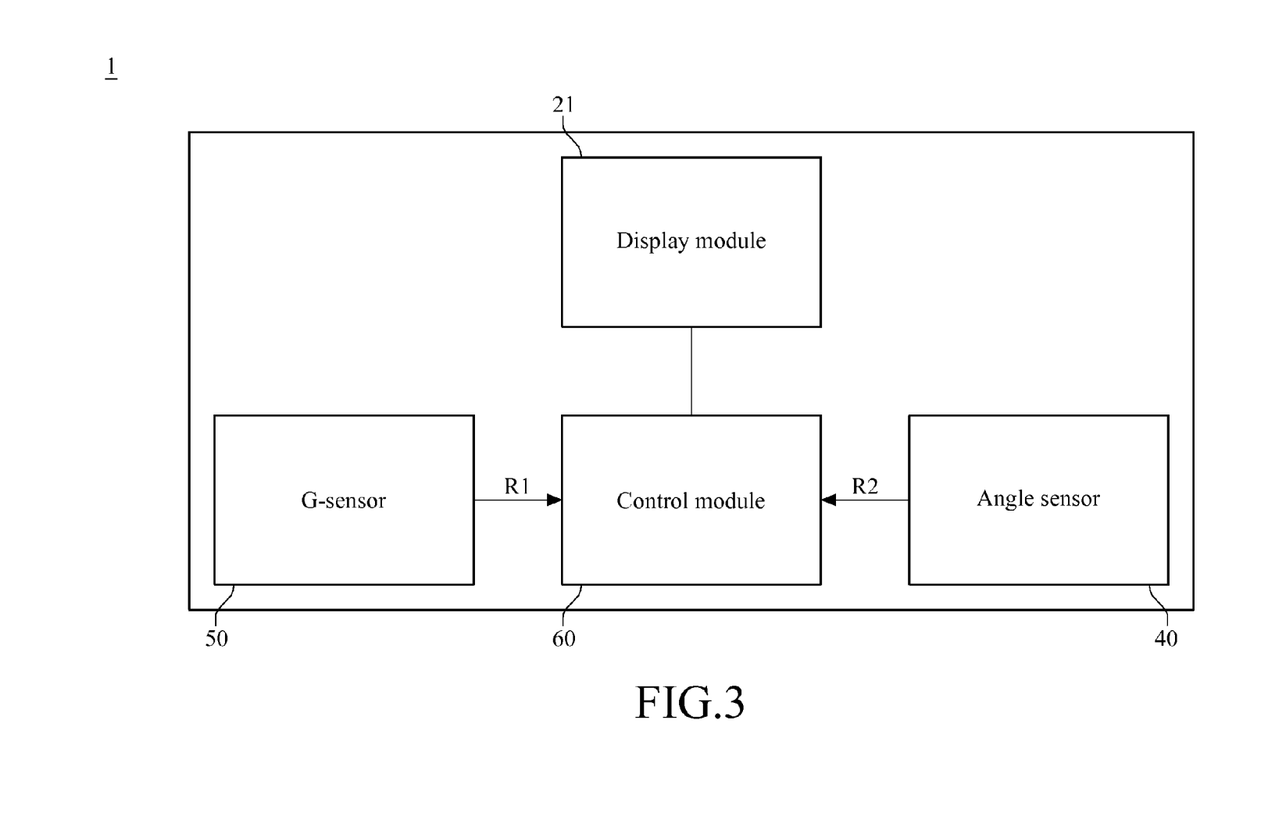
FIG. 3 is a block diagram of an electronic device according to an embodiment of the disclosure.

Please refer to FIGS. 1 to 3. FIG. 3 is a block diagram of an electronic device according to an embodiment of the disclosure. In this embodiment, the control module 60 is mounted inside the base 10 and electrically connected to the display module 21 of the display 20, the angle sensor 40 and the G-sensor 50. The control module 60 is adapted to control the rotation state of the display image 211 of the display 20 (the display image 211 is maintained or flipped over) according to a relative relationship between the absolute rotation angle detected by the G-sensor 50 and the relative rotation angle detected by the angle sensor 40. In other embodiments, the control module 60 is mounted at the display 20 or at the pivotal assembly 30. The control module 60 is adapted to store an absolute angle threshold corresponding to the absolute rotation angle, a first relative angle threshold corresponding to the relative rotation angle and a second relative angle threshold corresponding to the relative rotation angle that are set by the user or automatically set. The first relative angle threshold and the second relative angle threshold are both between 0 to 360 degrees, and the second relative angle threshold is defined to be greater than the first relative angle threshold. Furthermore, the absolute angle position of the first relative angle threshold in the absolute space coordinate in X-Y-Z axes shown in FIG. 1 may be the same as or different from the absolute angle position of the absolute angle threshold in the absolute space coordinate. In other words, in this disclosure, the control module 60 is a central processing unit, an embedded controller or an electronic circuit unit capable of executing logical determination or program. Additionally, the control module 60 may be software (e.g., firmware) or an operating system.

Figure 4A:
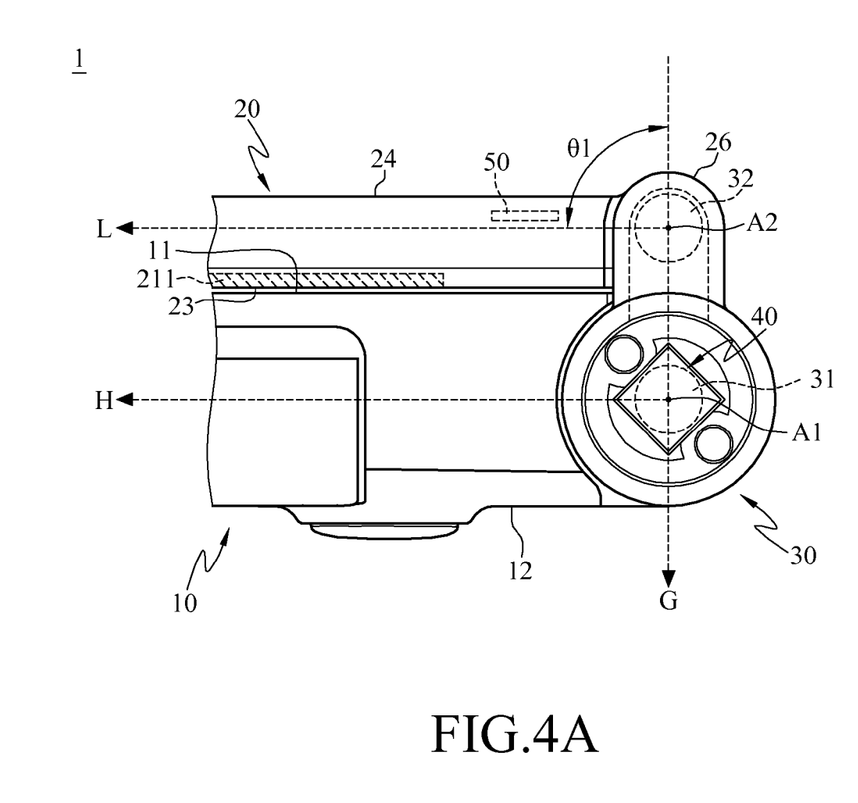
FIG. 4A is a side view of an electronic device at a first position according to an embodiment of the disclosure.

The following describes the method of the electronic device 1 for determining the automatic rotation of the display image 211. Please refer to FIG. 4A, which is a side view of an electronic device at a first position according to an embodiment of the disclosure. In this embodiment, the absolute rotation angle is defined as the angle between the display 20 and the gravity axis G, and the relative rotation angle is defined as the rotation angle of the first rotating axle 31 relative to the base 10 (or, when only one rotating axle is provided in other embodiments, the relative rotation angle is defined as the rotation angle between the display 20 and the base 10). Accordingly, for example, the absolute angle threshold corresponding to the absolute rotation angle is preset as 100 degrees, and the first relative angle threshold and the second relative angle threshold both corresponding to the relative rotation angle are preset as 190 and 220 degrees, respectively (or, when only one rotating axle is provided in other embodiments, the first relative angle threshold and the second relative angle threshold are set as 190 and 220 degrees, respectively). In one embodiment of the disclosure, the base 10 of the electronic device 1 may be disposed on a loaded object (not shown, e.g., a desktop or a lap of a user), and the second surface 12 faces the loaded object. In other words, the second surface 12 of the base 10 of the electronic device 1 faces a gravity axis G (when the base 10 is disposed horizontally). At the same time, both the first rotating axle 31 and the second rotating axle 32 do not rotate, a display extension line L is parallel to a base extension line H (the angle between the display extension line L and the base extension line H is 0)(when only one rotating axle is provided in other embodiments, the display extension line L is collinear with the base extension line H) such that the relative rotation angle is 0 degree (less than 190 degrees, the first relative angle threshold); the angle θ1 between the display extension line L and the gravity axis G is 90 degrees such that the absolute rotation angle is 90 degrees (so far, less than 100 degrees, the absolute angle threshold). This position of the electronic device 1 is defined as a closed state. Furthermore, since the display 20 is not open and/or not operated, it is not necessary to determine whether the display image 211 needs to be rotated (flipped over).

Moreover, in FIGS. 4A to 4E, the gravity axis G points towards the bottom side of the figures.

Figure 5:
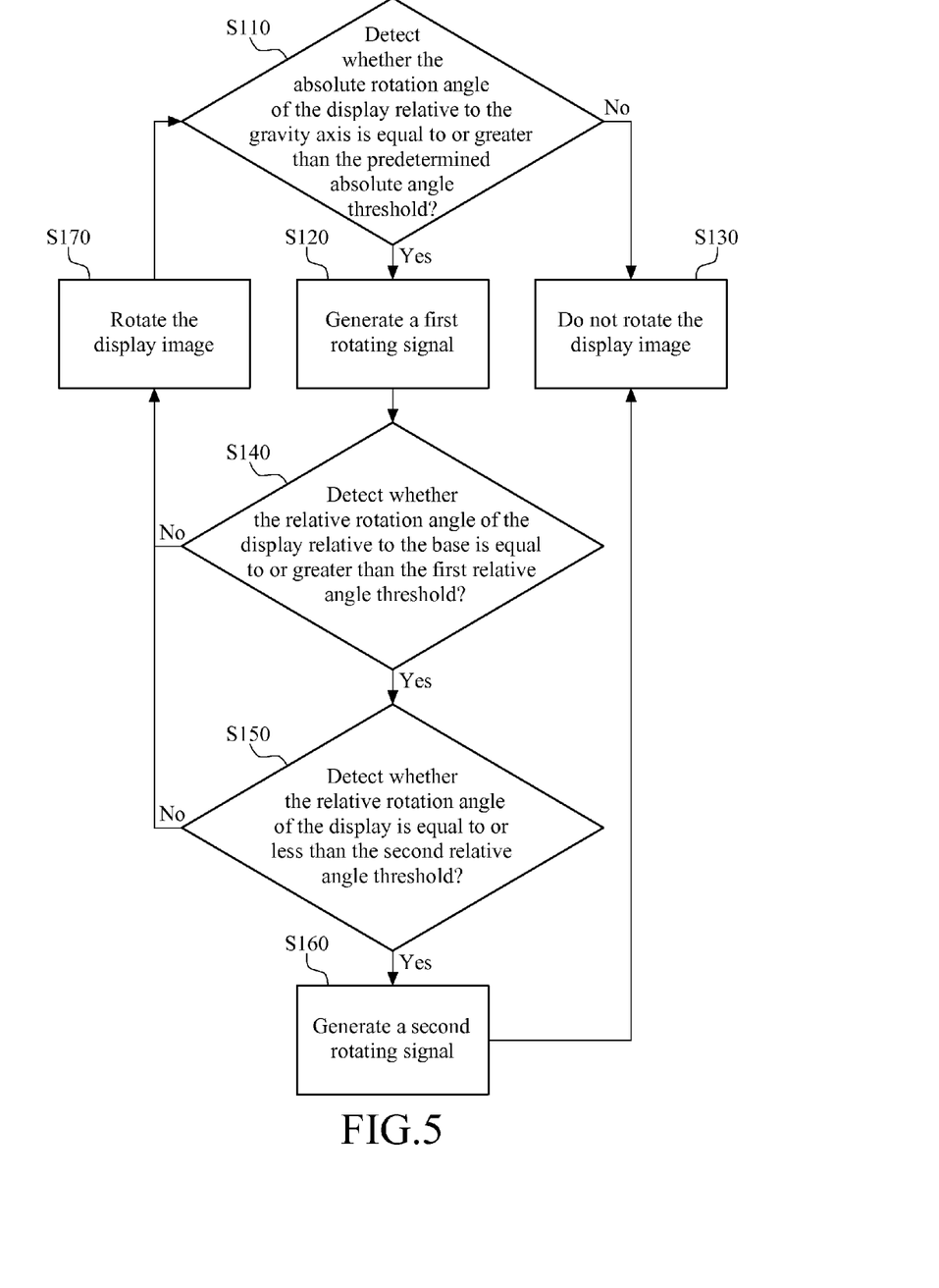
FIG. 5 is a flow chart of a method for rotating a display image of an electronic device according to an embodiment of the disclosure.

Please refer to FIGS. 1, 3 and 5, and the FIG. 5 is a flow chart of a method for rotating a display image of an electronic device according to an embodiment of the disclosure. The following describes the method of the electronic device for rotating (namely, flipping over) the display image 211 of the display 20.

First, the G-sensor 50 detects to determine whether the absolute rotation angle of the display 20 of the electronic device 1 relative to the gravity axis G is equal to or greater than a predetermined absolute angle threshold (Step S110).

When the absolute rotation angle is equal to or greater than the predetermined absolute angle threshold, a first rotating signal R1 is generated. Thus, the control module 60 receives the rotating signal R1 to control the display image 211 of the display 20 to rotate (flip over) from a first state (such as positive condition) to a second state (such as inversion condition), the display image 211 is rotated (flipped over)(Step S120).

When the absolute rotation angle is less than the predetermined absolute angle threshold, the first rotating signal R1 is not generated. Thus, the control module 60 does not control the display image 211 to rotate from the first state to the second state. That is to say, the display image 211 is not rotated (not flipped over) and maintains at the first state (such as positive condition)(Step S130).

The angle sensor 40 detects to determine whether the relative rotation angle of the display 20 of the electronic device 1 relative to the base 10 is equal to or greater than a first relative angle threshold (Step S140).

The angle sensor 40 detects to determine whether the relative rotation angle of the display 20 of the electronic device 1 relative to the base 10 is equal to or less than a second relative angle threshold (Step S150).

When the relative rotation angle is equal to or greater than the first relative angle threshold, and the relative rotation angle is also equal to or less than the second relative angle threshold, a second rotating signal R2 is generated. Thus, the control module 60 controls the display image 211 of the display 20 to rotate (namely, flip over) from a third state (such as inversion condition) to a fourth state (such as positive condition)(Step S160). In one embodiment, when the second state is the same as the third state, the fourth state will be the same as the first state, such that the display image 211 of the display 20 maintains its original orientation and does not rotate. For example, the first state and the second state are the positive condition and the inversion condition, respectively, and the third state and the fourth state are the inversion condition and the positive condition, respectively.

When the relative rotation angle is not equal to or greater than the first relative angle threshold in Step S140 or the relative rotation angle is greater than the second relative angle threshold in Step S150, the second rotating signal R2 is not generated. Thus, the control module 60 controls the display image 211 to rotate according to the first rotating signal R1 (Step S170). Afterwards, the process may proceed to Step S110 again, Steps S110 to S170 may be repeated to continuously determine whether the display image 211 needs to be rotated (namely, flipped over) or not.

Figure 4B:
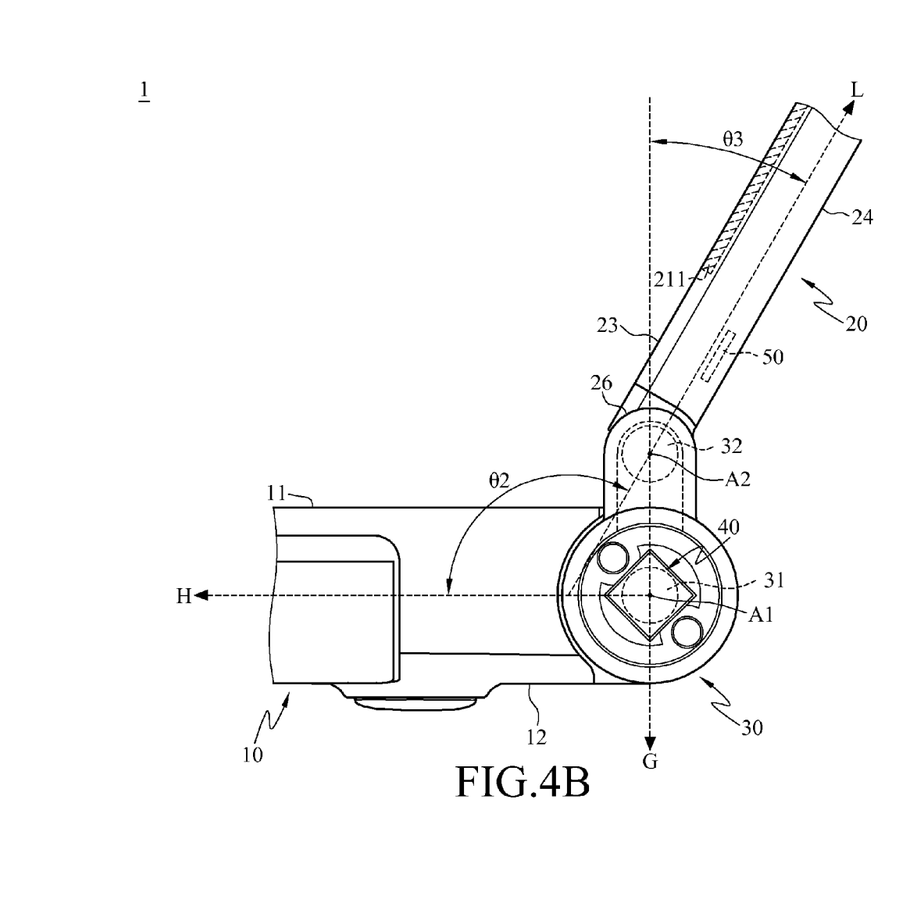
FIG. 4B is a side view of an electronic device at a second position according to an embodiment of the disclosure.

Please refer to FIGS. 2, 3 and 4B, FIG. 4B is a side view of an electronic device at a second position according to an embodiment of the disclosure. The display 20 starts to expand (rotates along clockwise direction in FIG. 4B), the third surface 23 rotates along the direction away from the first surface 11 of the base 10. Since the rotational damping of the first rotating axle 31 is greater than the rotational damping of the second rotating axle 32, the display 20 only starts to rotate about the connection member 36 by a relative rotation angle θ2 (such as 115 degrees, the angle between the display extension line L and the base extension line H), and the connection member 36 does not rotate about the base 10 at this moment. The above rotation is the first stage rotation. At this time, the G-sensor 50 detects the absolute rotation angle θ3 of the display 20 relative to the gravity axis G. Then, the control module 60 determines the absolute rotation angle θ3 (such as 25 degrees) relative to the gravity axis G is not greater than or equal to the predetermined absolute angle threshold (such as 100 degrees). That is, the control module 60 does not receive the first rotating signal R1 from the G-sensor 50 or the first rotating signal R1 is not generated by the control module 60, such that the control module 60 does not rotate the display image 211 of the electronic device 1 to maintain the original state of the display image. At this time, the display image 211 is defined as being at the positive condition, which means the user may view the display image 211 from the left side of the FIG. 4B.

Figure 4C:
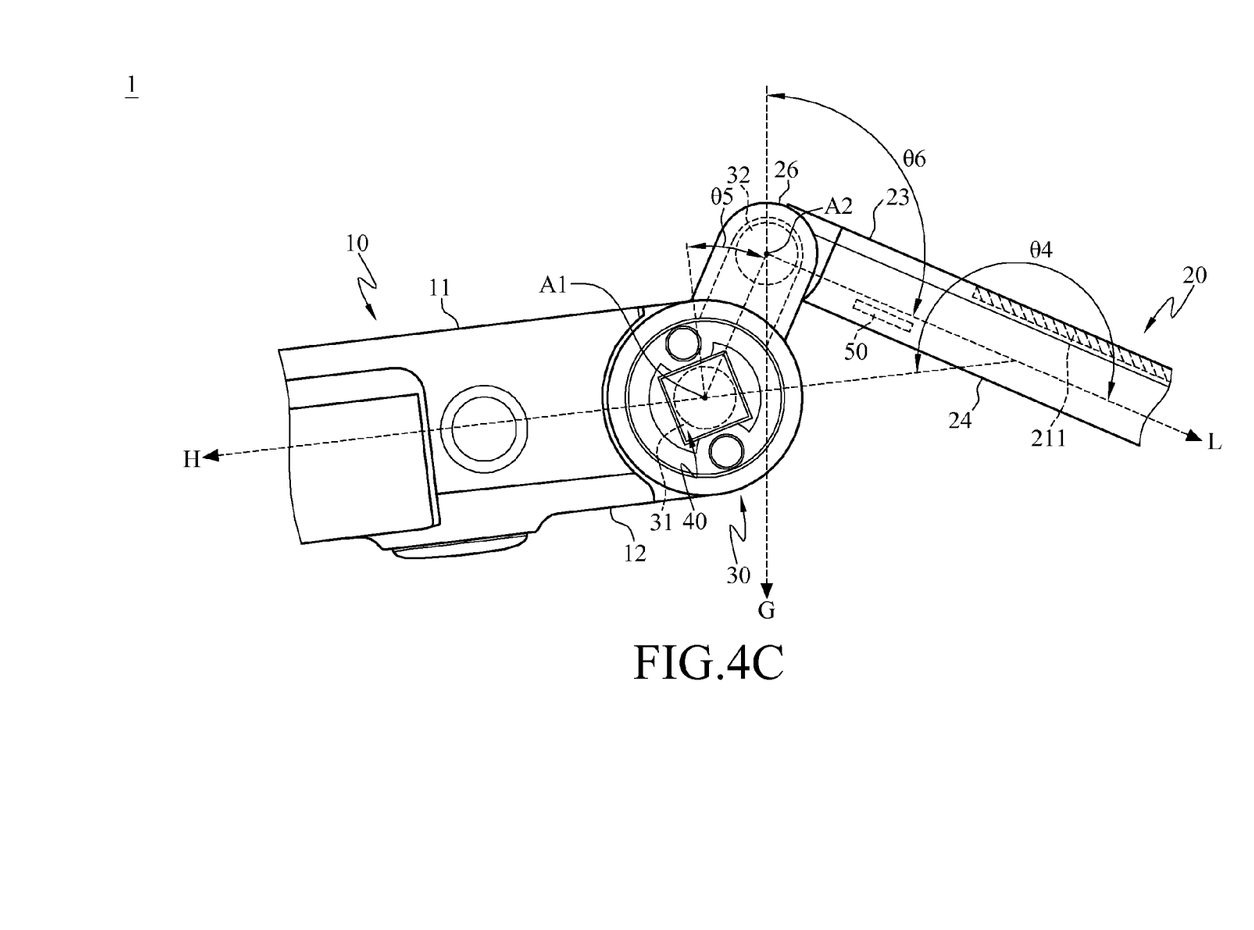
FIG. 4C is a side view of an electronic device at a third position according to an embodiment of the disclosure.

Please refer to FIGS. 2, 3 and 4C, and FIG. 4C is a side view of an electronic device at a third position according to an embodiment of the disclosure. The display 20 is kept rotating relative to the connection member 36 via the second rotating axle 32. When the display 20 rotates, by such as over 180 degrees (or other predetermined restriction degrees), relative to the connection member 36, the second rotating axle 32 is restricted because of its structure and cannot rotate any further. Thereafter, the first rotating axle 31 may start to rotate (that is, the second stage rotation) after the second rotating axle 32 stops rotating, the connection member 36 may rotate about the base 10 such that the display 20 may rotate about the base 10 by a relative rotation angle θ4 (such as 205 degrees). For example, the base 10 may be put on the lap of the user to operate, and the user may view the display image 211 from the left side of the FIG. 4C. At this time, the absolute rotation angle θ6 (such as 105 degrees) of the display 20 relative to the gravity axis G detected by the G-sensor 50 is greater than the absolute angle threshold (such as 100 degrees), the control module 60 receives the first rotating signal R1 or the first rotating signal R1 is not generated by the control module 60, the control module 60 controls the display image 211 of the display 20 to be rotated (flipped over). At the same time, the angle sensor 40 also detects the rotation angle θ5 of the connection member 36 relative to the base 10 is 25 degrees. The control module 60 determines the relative rotation angle θ4 of the display 20 (θ5 plus 180 degrees), e.g., 205 degrees, relative to the base 10 by the value detected by the angle sensor 40, and the relative rotation angle θ4 is between the first relative angle threshold (such as 190 degrees) and the second relative angle threshold (such as 220 degrees). Thus, when the control module 60 receives the second rotating signal R2 or the control module 60 determines not to generate the second rotating signal R2, the display image 211 of the display 20 is rotated (flipped over) again. As a result, the display image 211 maintains at its original positive condition and does not rotate (not flip over) in order to meet the using situation required by the user.

Figure 4D:
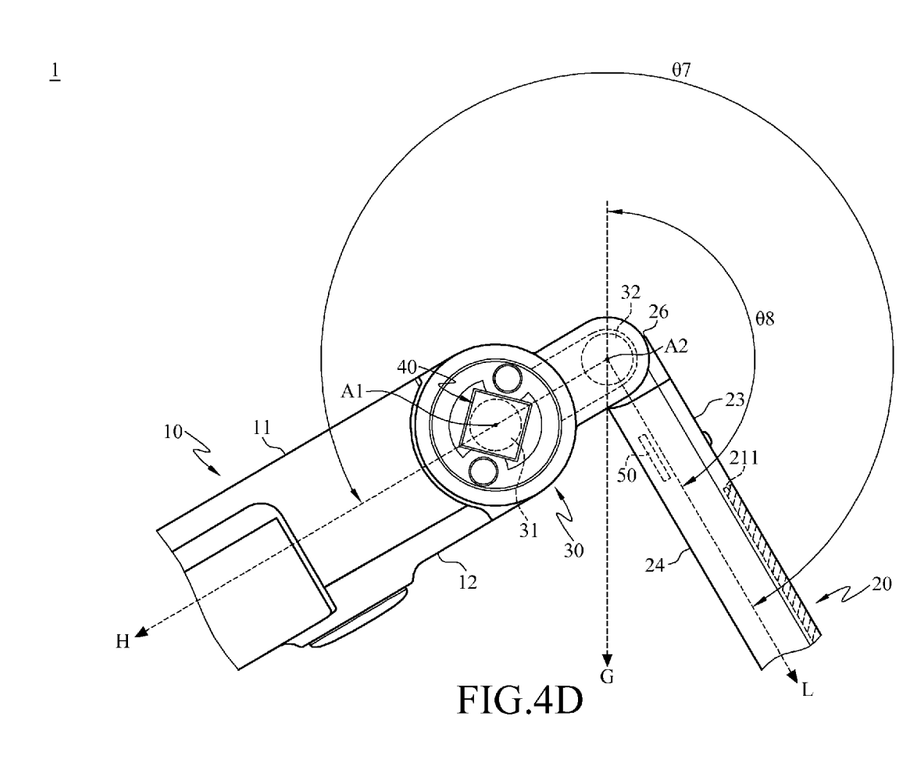
FIG. 4D is a side view of an electronic device at a fourth position according to an embodiment of the disclosure.

Please refer to FIGS. 2, 3 and 4D, and FIG. 4D is a side view of an electronic device at a fourth position according to an embodiment of the disclosure. Then, the display 20 keeps driving the first rotating axle 31 to rotate, such that the display 20 rotates about the base 10 by a relative rotation angle θ7 (such as 270 degrees). At this time, the second surface 12 of the base 10 faces the fourth surface 24 of the display 20, and the electronic device 1 may stand on the loaded object for use (such as the electronic device 1 stands on a desk with reverse-V shape). At this moment, the G-sensor 50 detects to determine the absolute rotation angle θ8 (150 degrees) of the display 20 relative to the gravity axis G is greater than the absolute angle threshold (such as 100 degrees), and therefore, the control module 60 receives the first rotating signal R1 from the G-sensor 50 or the control module 60 does not generate the first rotating signal R1 so as to control the display image 211 to rotate. Since the relative rotation angle θ7 (such as 270 degrees) of the display 20 detected by the angle sensor 40 relative to the base 10 is not between the first relative angle threshold (such as 190 degrees) and the second relative angle threshold (such as 220 degrees), the second rotating signal R2 is not generated. Thus, the control module 60 maintains the display image 211 to remain at the inversion condition in response to the first rotating signal R1. As a result, another user may view the display image 211 of the display 20 at the right side of FIG. 4D at the positive direction.

It should be noted that in this embodiment, the disclosure is not limited to values of the absolute angle threshold, the first relative angle threshold and the second relative angle threshold and relationships between the absolute angle threshold, the first relative angle threshold and the second relative angle threshold described in this embodiment. As long as the values and the relationship satisfy the method for rotating the display image in this disclosure, they appertain to the scope of this disclosure.

Moreover, after Step S130 or Step S170 is performed to determine whether the display image 211 is rotated or maintained, the process may proceed Step S110 again to generate a continuous determination loop for determining whether the orientation of the display image 211 needs to rotate (flip over) or not.

According to the above-mentioned method for rotating the display image 211 of the electronic device 1, when the display 20 rotates about the base 10 via the pivotal assembly 30, the electronic device 1 determines whether the display image 211 is rotated (flipped over) or not according to the relationship between the absolute rotation angle of the display 20 relative to the gravity axis G and the absolute angle threshold as well as the relationship that whether the relative rotation angle between the display 20 and the base 10 is between the first relative angle threshold and the second relative angle threshold. Such a determination method solves the conventional problem that the display image 211 may be flipped over unexpectedly. Thus, the orientation of the display image 211 may be adjusted more accurately according to the current using situation of the user.

However, the number of the rotating axles of each pivotal assembly 30 in this disclosure is two, and the angle sensor 40 detects the rotation angle of the first rotating axle 31 according to the relationship of relative positions between the main body 41 and the rotatable switch 42, thereby obtaining the relative rotation angle between the display 20 and the base 10. However, the disclosure is not limited to the above-mentioned feature. The following describes another embodiment which having different numbers of rotating axle of pivotal assembly 30 and different structures of angle sensor 40. Please refer to FIG. 6, which is a side view of an electronic device at a first position according to another embodiment of the disclosure. The configuration in this embodiment is similar to that in the above-mentioned embodiments, so the same numerals represent similar structures. The difference between this embodiment and the above-mentioned embodiments is that each pivotal assembly 30 in this embodiment includes only one rotating axle 37. The display 20 is adapted to rotate about the base 10 by 360 degrees via the rotating axle 37. The angle sensor 40 is mounted at one of the pivotal assemblies 30. The angle sensor 40 is a triggering switch comprising a first electrical contact 43 and a second electrical contact 44. With the rotation of the rotating axle 37, the first electrical contact 43 and the second electrical contact 44 may be relatively closer (such as the arrow in FIG. 6) or farther away from each other, such that the first electrical contact 43 and the second electrical contact 44 are in contact to be electrically connected (namely, being conducted) or not in contact to be electrically disconnected. Accordingly, it can inform the control module 60 whether the relative rotation angle is between the predetermined first relative angle threshold (such as 190 degrees) and the predetermined second relative angle threshold (such as 220 degrees). Thus, the angle sensor 40 can detect the rotation angle of the rotating axle 37. For example, when the rotating axle 37 rotates by an angle between the first relative angle threshold and the second relative angle threshold, the first electrical contact 43 and the second electrical contact 44 are in contact to be electrically connected to generate the second rotating signal R2. The control module (not shown) is informed that the amount of relative rotation of the rotating axle 37 is between the first relative angle threshold and the second relative angle threshold; when the rotating axle 37 rotates by another angle outside of the first relative angle threshold and the second relative angle threshold, the first electrical contact 43 and the second electrical contact 44 are not in contact with each other so the second rotating signal R2 is not generated, the control module is informed that the amount of relative rotation of the rotating axle 37 is outside of the first relative angle threshold and the second relative angle threshold. Thus, the control module is adapted to determine whether the display image 211 of the electronic device 2 is maintained or rotated (flipped over) based on the amount of relative rotation of the rotating axle 37 and the relationship between the absolute rotation angle of the display 20 detected by the G-sensor 50 and the absolute angle threshold.

Figure 6:
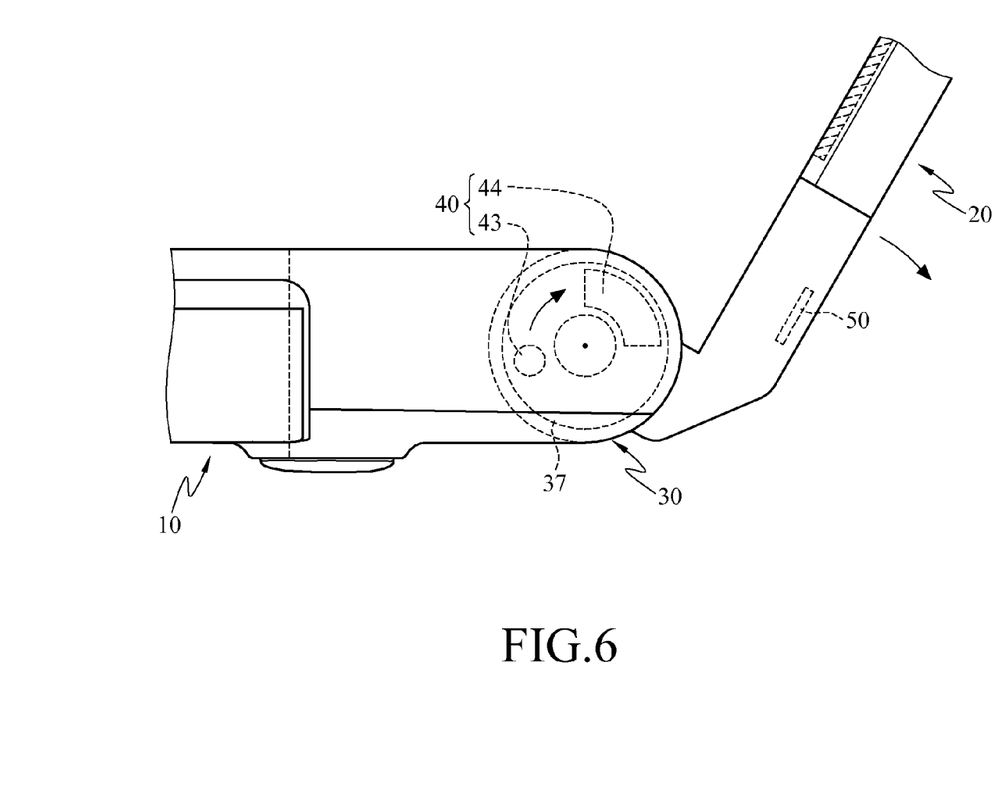
FIG. 6 is a side view of an electronic device at a first position according to another embodiment of the disclosure.

Hence, when the pivotal assembly 30 comprises only one rotating axle 37, the electronic device 2 may determine whether the display image 211 needs to be rotated (flipped over) according to the relative relationship between the absolute rotation angle and the absolute angle threshold and the relative relationships between the amount of relative rotation of the rotating axle 37, the first relative angle threshold and the second relative angle threshold, so as to meet the using situation of the user.

In conclusion, according to the electronic device capable of rotating the display image, the electronic device comprises both the angle sensor and the gravity sensor. The gravity sensor detects to determine whether the absolute rotation angle of the display of the electronic device relative to the gravity axis is greater than or equal to the predetermined absolute angle threshold. The angle sensor detects to determine whether the relative rotation angle of the display of the electronic device relative to the base is equal to or greater than the first relative angle threshold as well as equal to or less than the second relative angle threshold. When the relative rotation angle is equal to or greater than the first relative angle threshold and equal to or less than the second relative angle threshold, the orientation of the display image of the display maintains at its original orientation and is not rotated (not flipped over). When the relative rotation angle is not equal to or greater than the first relative angle threshold and equal to or less than the second relative angle threshold, the display image of the display is rotated (flipped over) based on the determination of the gravity sensor. Therefore, according to the above-mentioned structure and method, the orientation of the display image of the electronic device may be adjusted appropriately according to the viewing angle of the user, which prevents the display image from unexpected rotation, thereby achieving user-friendly design.

What is claimed is:

1. A method for rotating a display image of an electronic device, the electronic device having a display and a base pivoted to the display, the method comprising:
   detecting whether an absolute rotation angle of the display of the electronic device relative to a gravity axis is equal to or greater than a predetermined absolute angle threshold;
   detecting whether a relative rotation angle of the display of the electronic device relative to the base is equal to or greater than a first relative angle threshold and is equal to or less than a second relative angle threshold, wherein the second relative angle threshold is larger than the first relative angle threshold;
   maintaining an orientation of the display image shown by the display when the absolute rotation angle of the display is equal to or greater than the predetermined absolute angle threshold and the relative rotation angle is equal to or greater than the first relative angle threshold and is equal to or less than the second relative angle threshold; and
   rotating the orientation of the display image shown by the display when the absolute rotation angle of the display is equal to or greater than the predetermined absolute angle threshold but the relative rotation angle is not equal to or greater than the first relative angle threshold, or is not equal to or less than the second relative angle threshold;
   wherein a gravity sensor is adapted to detect whether the absolute rotation angle of the display of the electronic device relative to the gravity axis is greater than or equal to the predetermined absolute angle threshold, wherein when the absolute rotation angle of the display of the electronic device relative to the gravity axis is greater than or equal to the predetermined absolute angle threshold, a first rotating signal is generated in response, wherein an angle sensor is adapted to detect whether the relative rotation angle of the display of the electronic device relative to the base is greater than or equal to the first relative angle threshold and is less than or equal to the second relative angle threshold, when the relative rotation angle is equal to or greater the first relative angle threshold and is equal to or less than the second relative angle threshold, a second rotating signal is generated in response;
   wherein the display image is not rotated when the first rotating signal and the second rotating signal are generated at the same time.

2. The method according to claim 1, after detecting whether the absolute rotation angle of the display of the electronic device relative to the gravity axis is equal to or greater than the predetermined absolute angle threshold, further comprising maintaining the orientation of the display image shown by the display when the absolute rotation angle of the display relative to the gravity axis is not equal to or greater than the predetermined absolute angle threshold.

3. A method for rotating a display image of an electronic device, the electronic device comprising a control module, a gravity sensor, an angle sensor, a display and a base pivotally connected to the display and having an orientation, the display being adapted to display the display image, the method comprising:
   determining whether an absolute rotation angle of the display relative to a gravity axis detected by the gravity sensor is equal to or greater than a predetermined absolute angle threshold, wherein when the absolute rotation angle is equal to or greater than the predetermined absolute angle threshold, a first rotating signal is generated;
   determining whether a relative rotation angle of the display relative to the base detected by the angle sensor is equal to or greater than a first relative angle threshold and is equal to or less than a second relative angle threshold, wherein when the relative rotation angle is equal to or greater than the first relative angle threshold and is equal to or less than the second relative angle threshold, a second rotating signal is generated, wherein the second relative angle threshold is larger than the first relative threshold; and
   determining to control whether the display image is rotated by the control module according to a relative relationship between the first rotating signal and the second rotating signal received by the control module;
   wherein when the control module receives the first rotating signal and the second rotating signal at the same time, the control module controls the display image not to rotate.

4. The method according to claim 3, wherein when the control module only receives the first rotating signal without receiving the second rotating signal, the control module controls the display image to rotate.

5. The method according to claim 4, wherein when the control module receives the first rotating signal, the control module controls the display image to rotate from a first state to a second state, when the first state is a positive condition, the second state is an inversion condition such that the display image is rotated to the inversion condition.

6. The method according to claim 3, wherein when the control module receives the first rotating signal, the control module controls the display image to rotate from a first state to a second state; when the control module receives the second rotating signal, the control module controls the display image to rotate from a third state to a fourth state.

7. The method according to claim 6, wherein when the first state is a positive condition and the second state is an inversion condition, the third state is the inversion condition and the fourth state is the positive condition, such that the display image is not rotated to maintain at the positive condition.

8. The method according to claim 3, wherein the electronic device is located in an absolute space coordinate defined by an x-axis direction, a y-axis direction and a z-axis direction, and an absolute angle position of the first relative angle threshold in the absolute space coordinate is the same as an absolute angle position of the predetermined absolute angle threshold in the absolute space coordinate.

9. The method according to claim 3, wherein the electronic device is located in an absolute space coordinate defined by an X-axis direction, a y-axis direction and a z-axis direction, and an absolute angle position of the first relative angle threshold in the absolute space coordinate is different from an absolute angle position of the predetermined absolute angle threshold in the absolute space coordinate.

10. An electronic device, capable of rotating a display image, comprising:
   a base;
   a display having a top end and a bottom end that are opposite to each other;
   a pivotal assembly comprising at least one rotating axle, the bottom end of the display being pivotally connected to the base via the pivotal assembly;
   an angle sensor mounted at the at least one rotating axle, for detecting a relative rotation angle of the display relative to the base;
   a gravity sensor mounted at the display, for detecting an absolute rotation angle of the display relative to a gravity axis; and
   a control module adapted to control a rotating state of a display image of the display according to a relative relationship between the absolute rotation angle and the relative rotation angle;
   wherein when the absolute rotation angle detected by the gravity sensor is equal to or greater than a predetermined absolute angle threshold, a first rotating signal is generated, and the control module receives the first rotating signal to control the display image to rotate;
   wherein the relative rotation angle detected by the angle sensor is equal to or greater than a first relative angle threshold and is equal to or less than a second relative angle threshold, a second rotating signal is generated, and the control module receives the second rotating signal to rotate the display image, and the second relative angle threshold is larger than the first relative angle threshold;
   wherein when the control module receives the first rotating signal and the second rotating signal at the same time, the control module controls the display image not to rotate.

11. The electronic device according to claim 10, wherein the number of the at least one rotating axle of the pivotal assembly is two, and the two rotating axes of the pivotal assembly are parallel to each other but not coaxial with each other.

12. The electronic device according to claim 11, wherein the at least one rotating axle comprises a first rotating axle and a second rotating axle, the pivotal assembly further comprises a connection member and a housing, both the first rotating axle and the second rotating axle are pivoted to the connection member, and the housing covers the connection member, at least a portion of the first rotating axle and at least a portion of the second rotating axle.

13. The electronic device according to claim 12, wherein the angle sensor is a variable resistor, the variable resistor comprises a rotatable switch and a main body mounted at the rotatable switch, the rotatable switch is disposed at the first rotating axle or the second rotating axle, and the main body is disposed at the housing.

14. The electronic device according to claim 12, wherein the pivotal assembly further comprises a first fixing member and a second fixing member, the first fixing member is fixedly disposed on the first rotating axle and the base, and the second fixing member is fixedly disposed on the second rotating axle and the display.

15. The electronic device according to claim 10, wherein the number of the at least one rotating axle of the pivotal assembly is one.

16. The electronic device according to claim 15, wherein the angle sensor is a triggering switch, the triggering switch comprises a first electrical contact and a second electrical contact, and both the first electrical contact and the second electrical contact are adapted to move relative to each other with a rotation of the rotating axle.

17. The electronic device according to claim 10, wherein when the control module only receives the first rotating signal without receiving the second rotating signal, the control module controls the display image to rotate.

* * * * *